United States Patent Office 3,442,305
Patented May 6, 1969

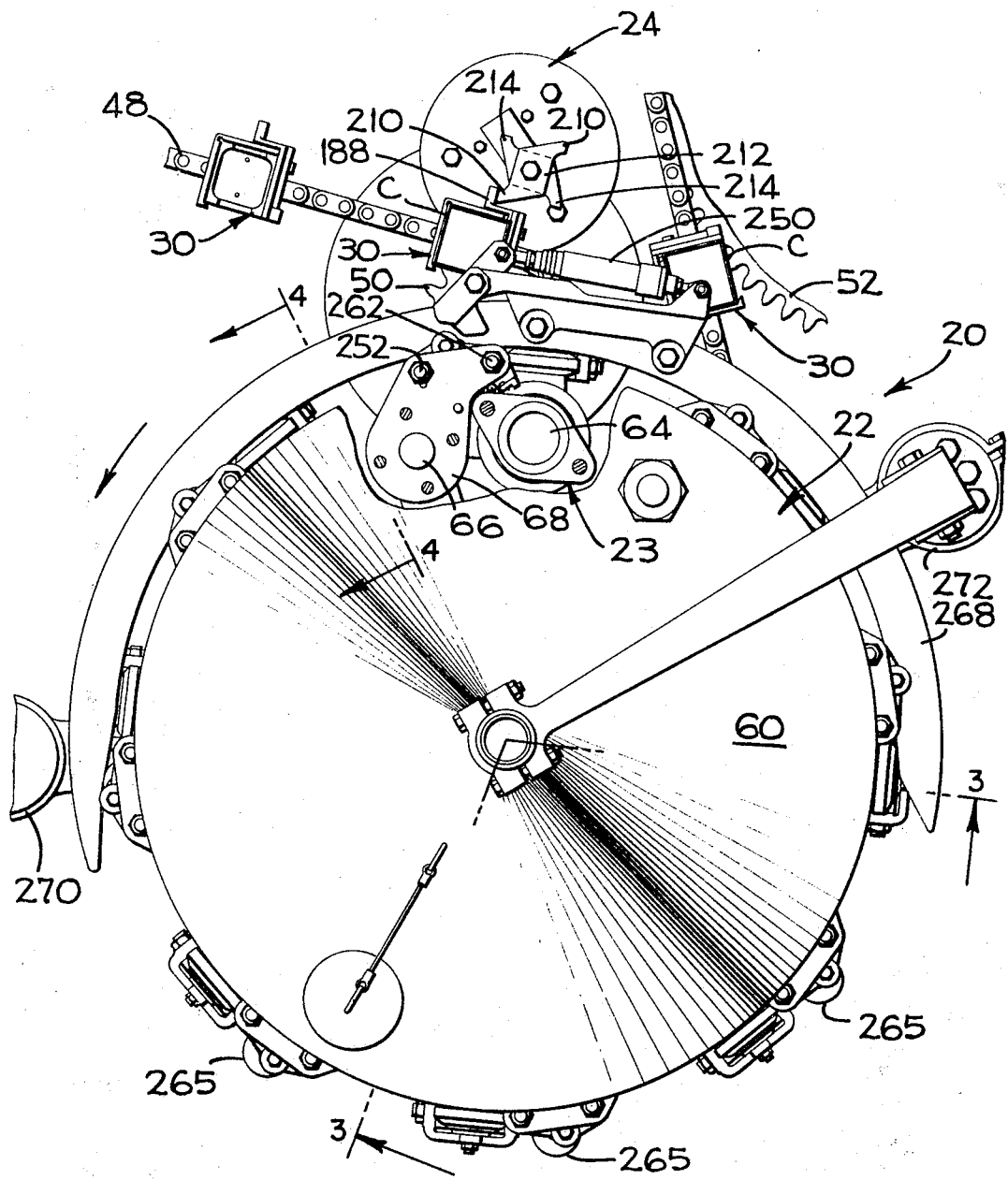

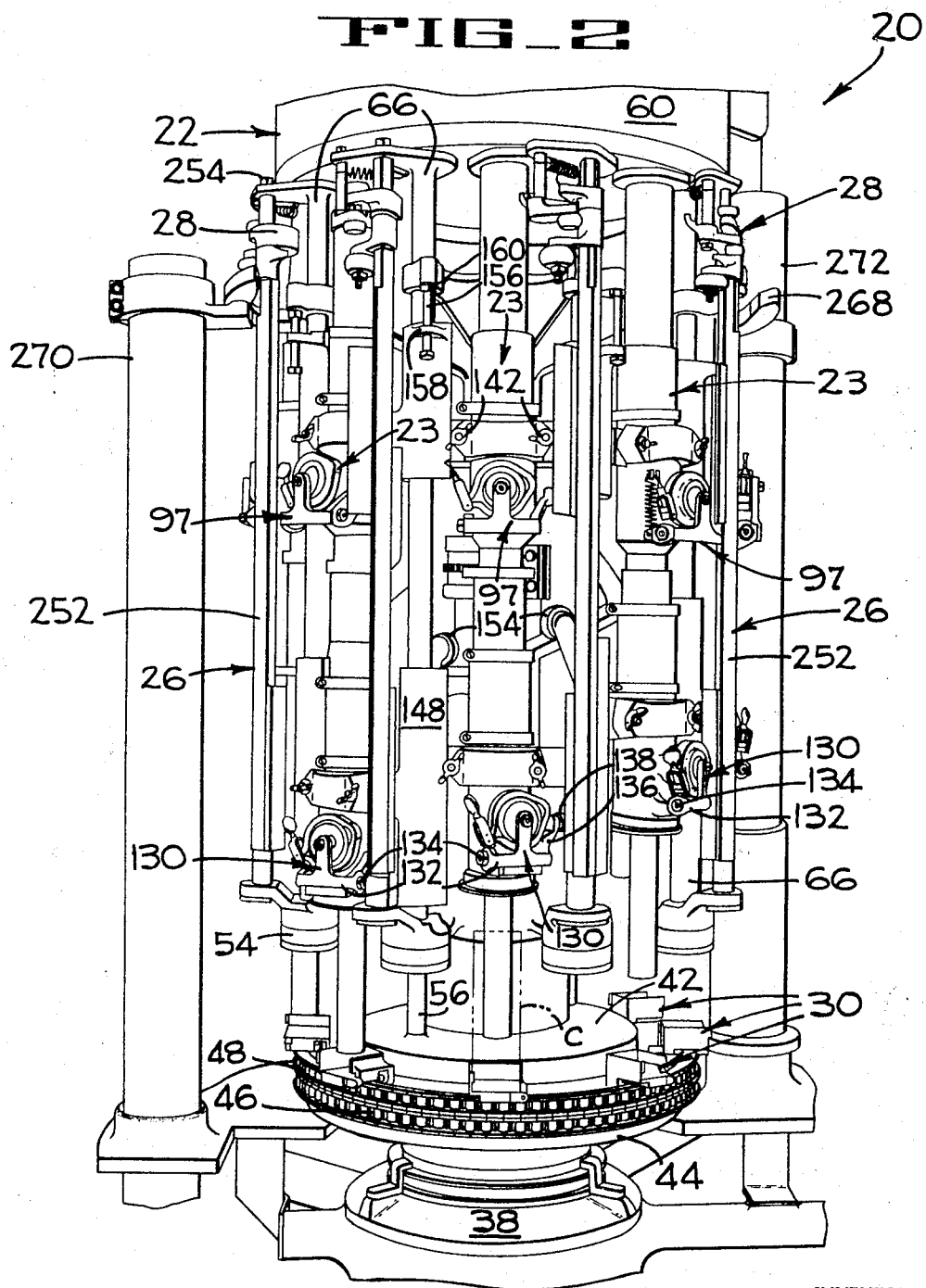

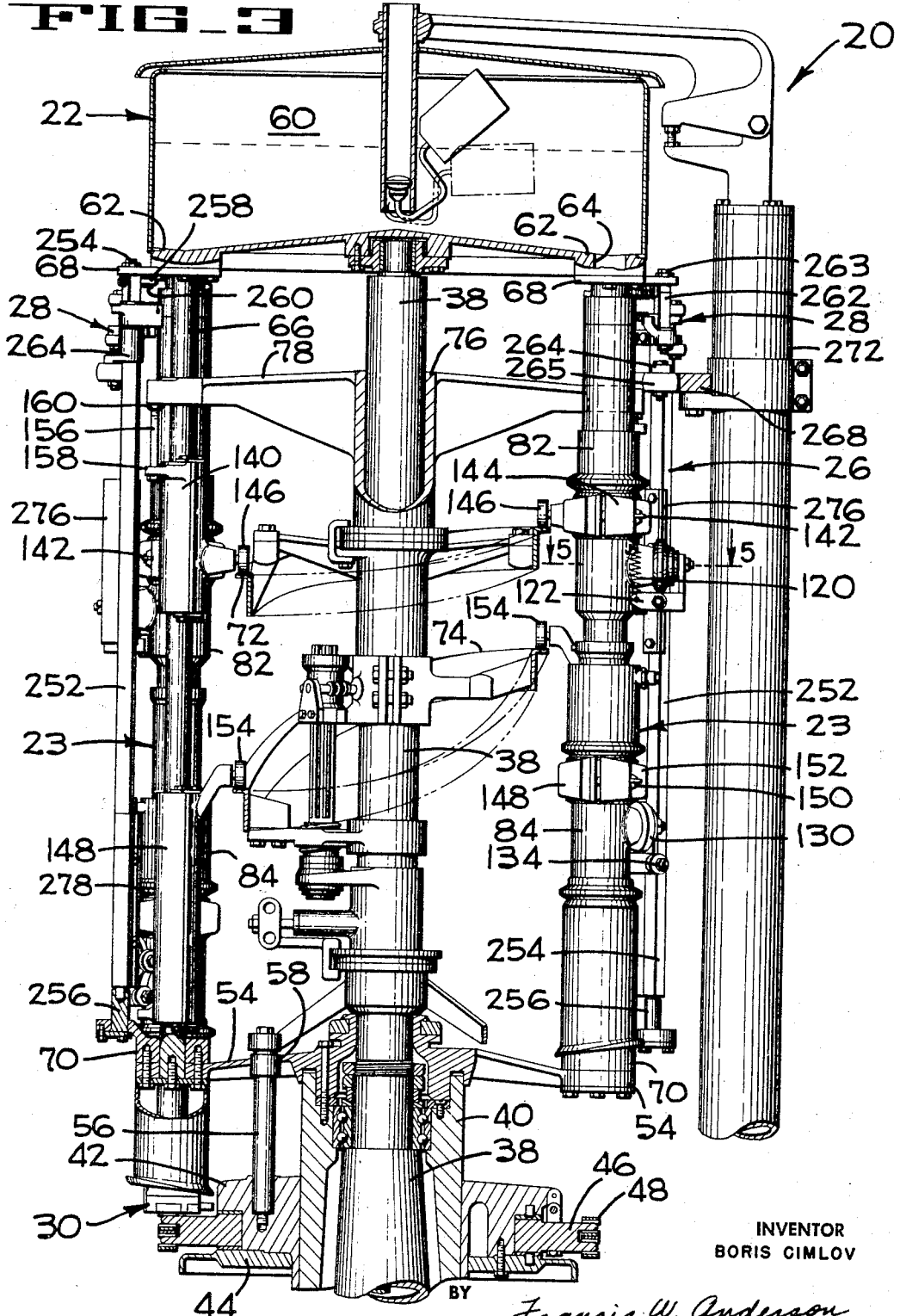

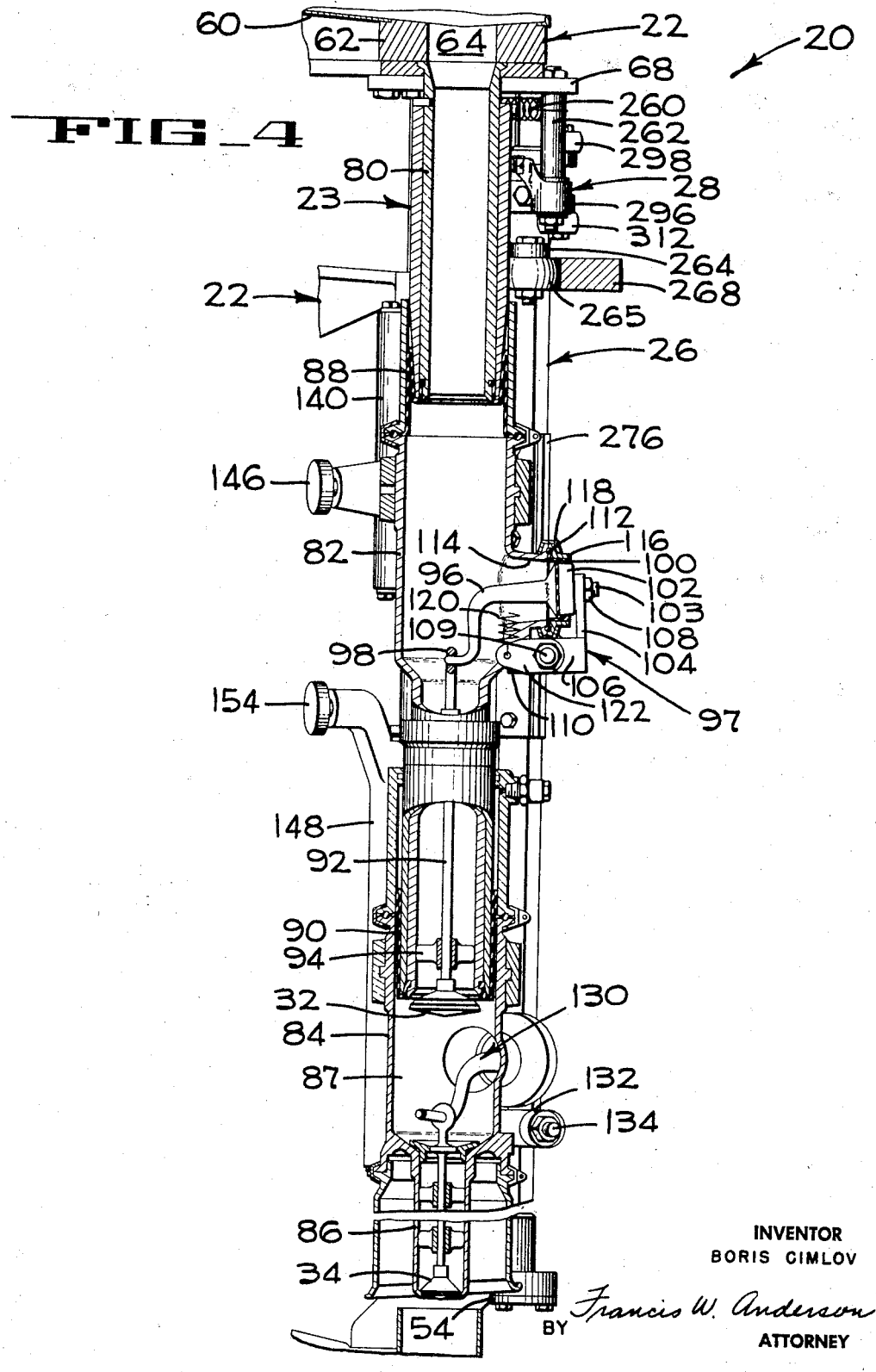

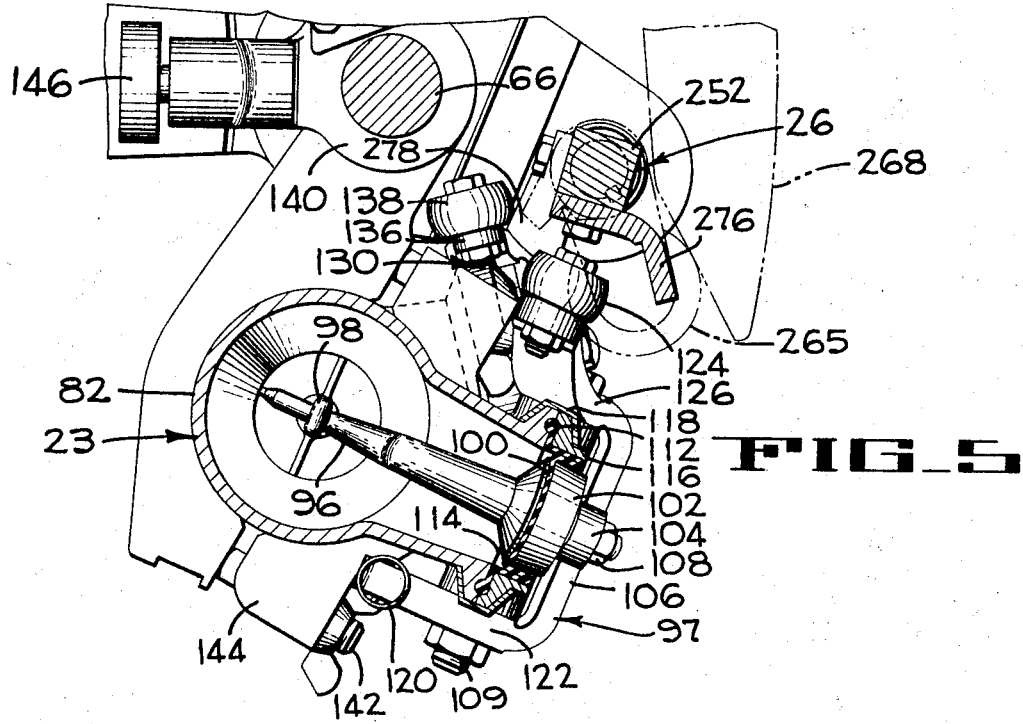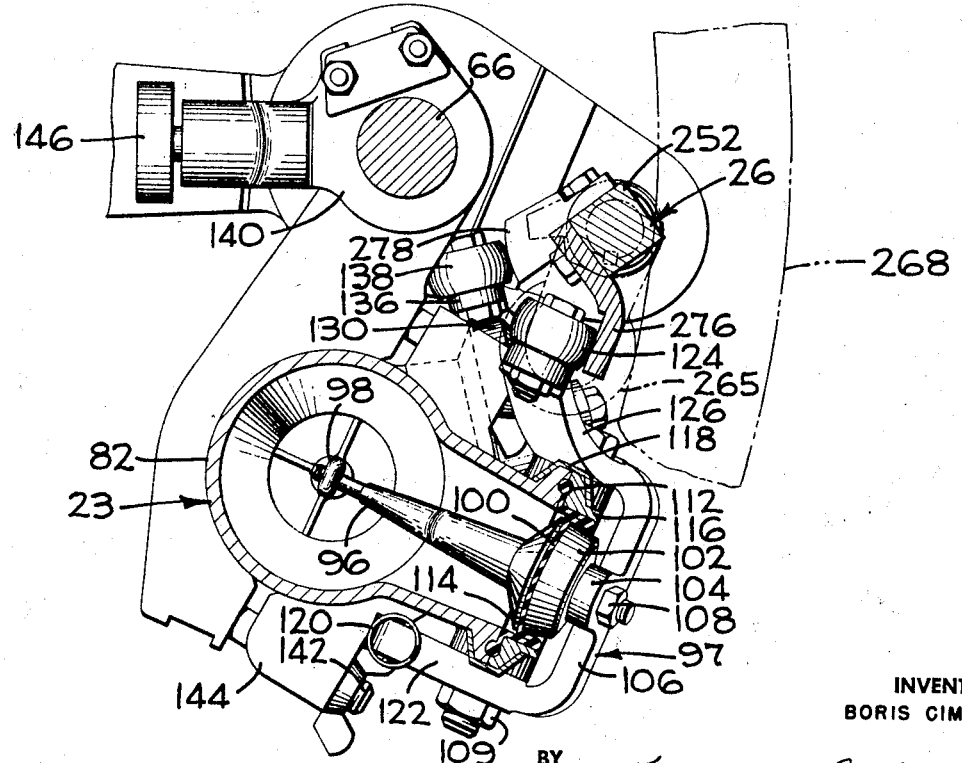

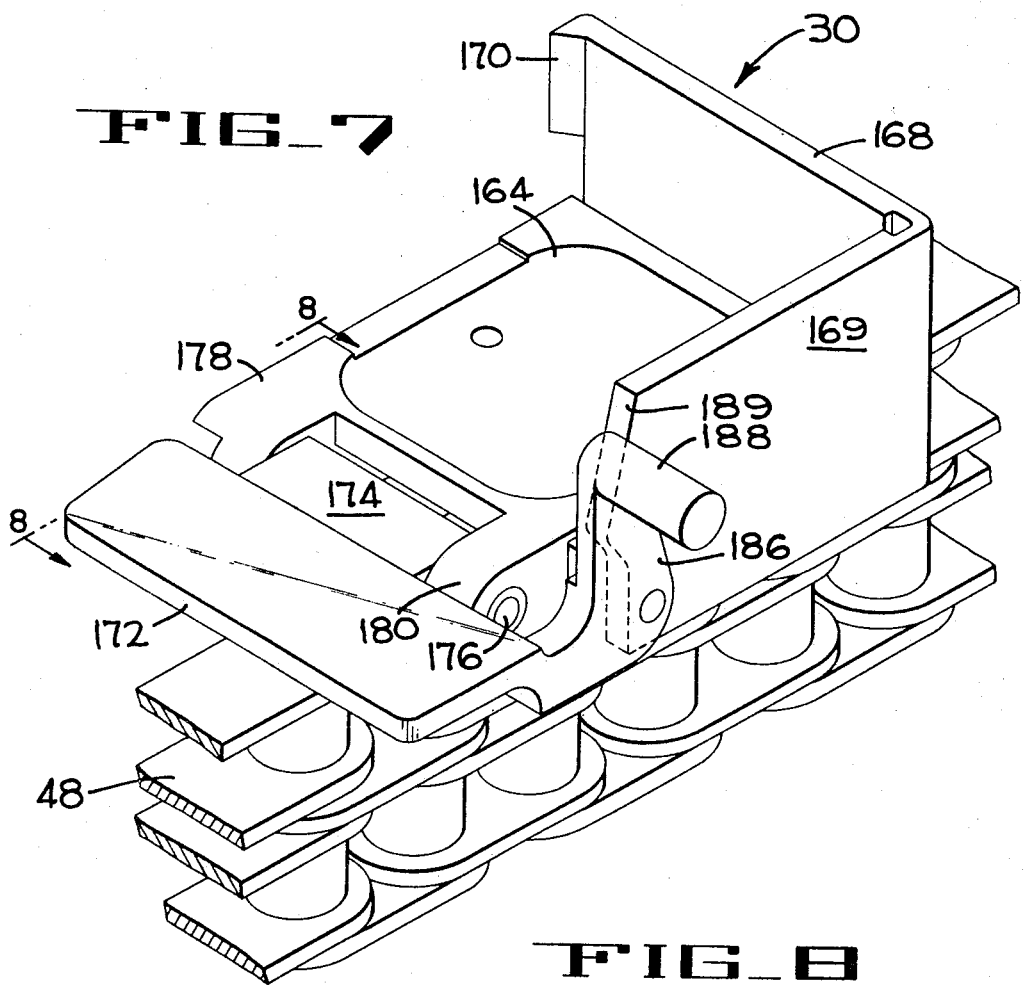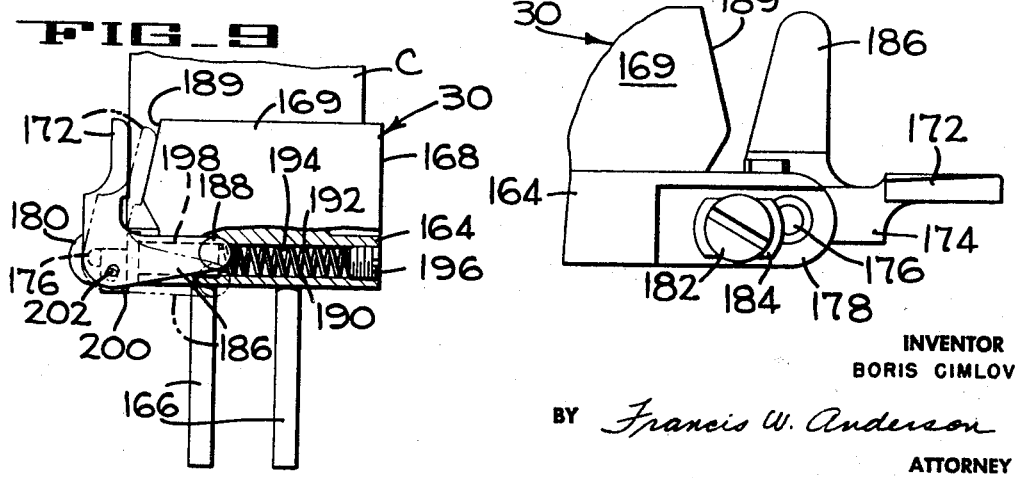

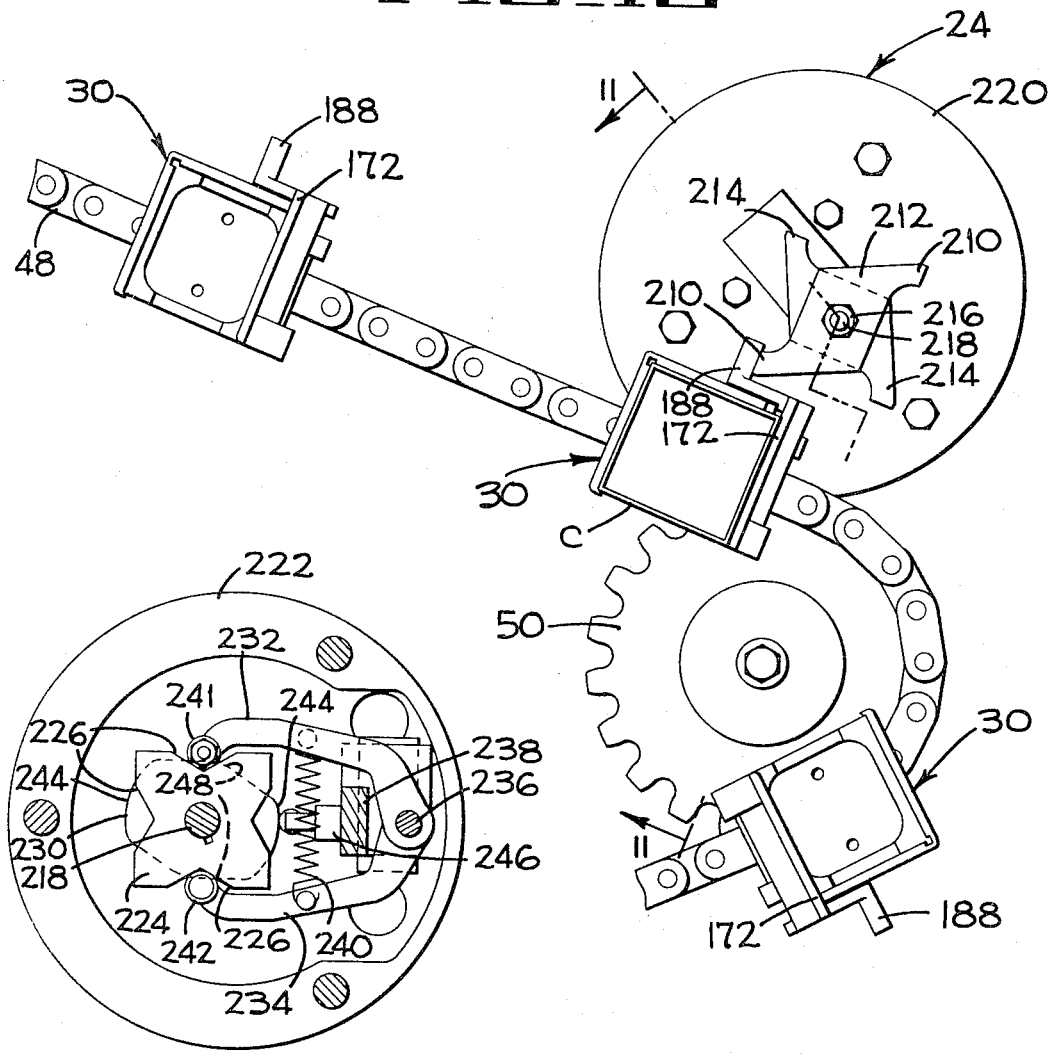

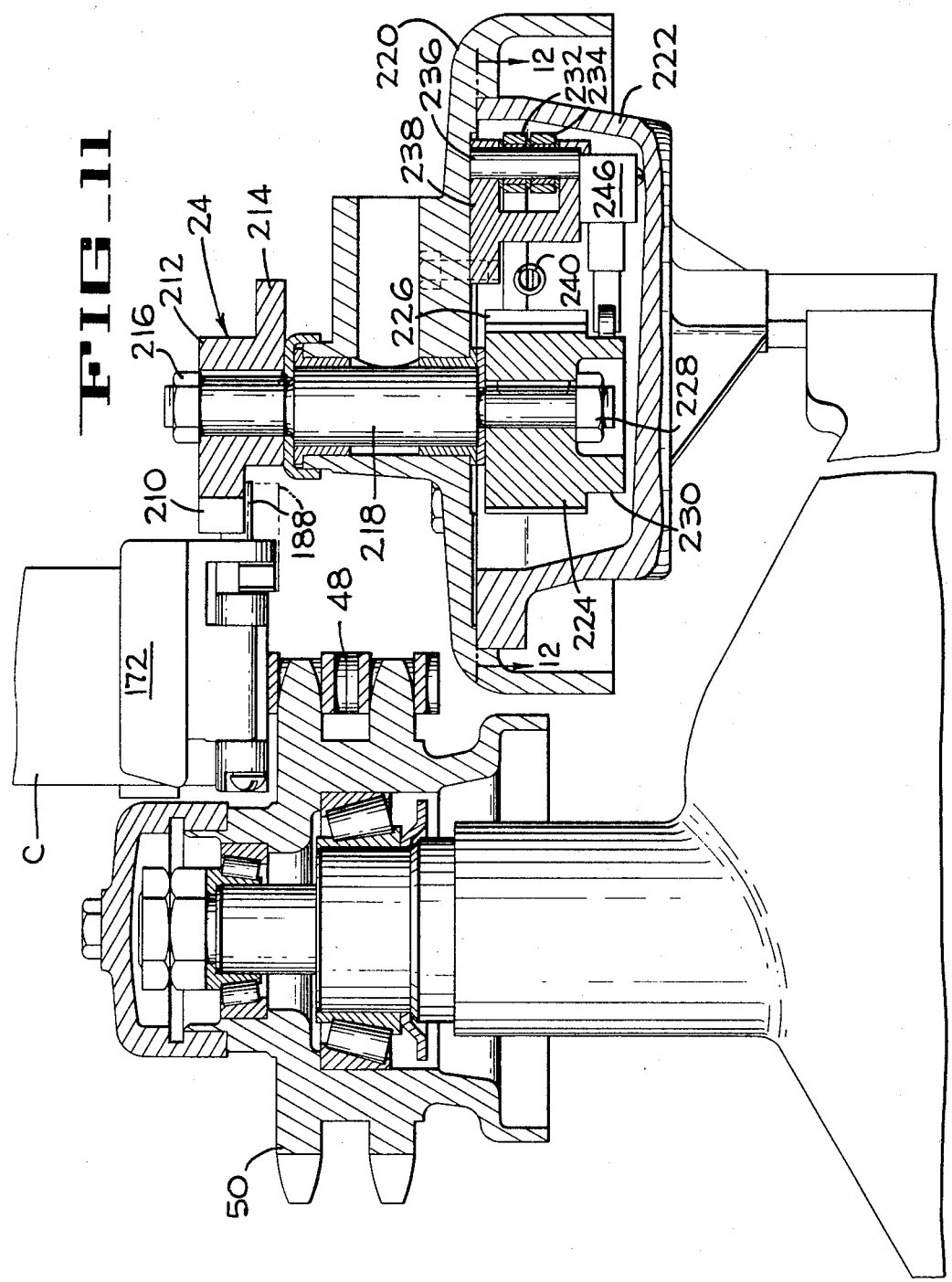

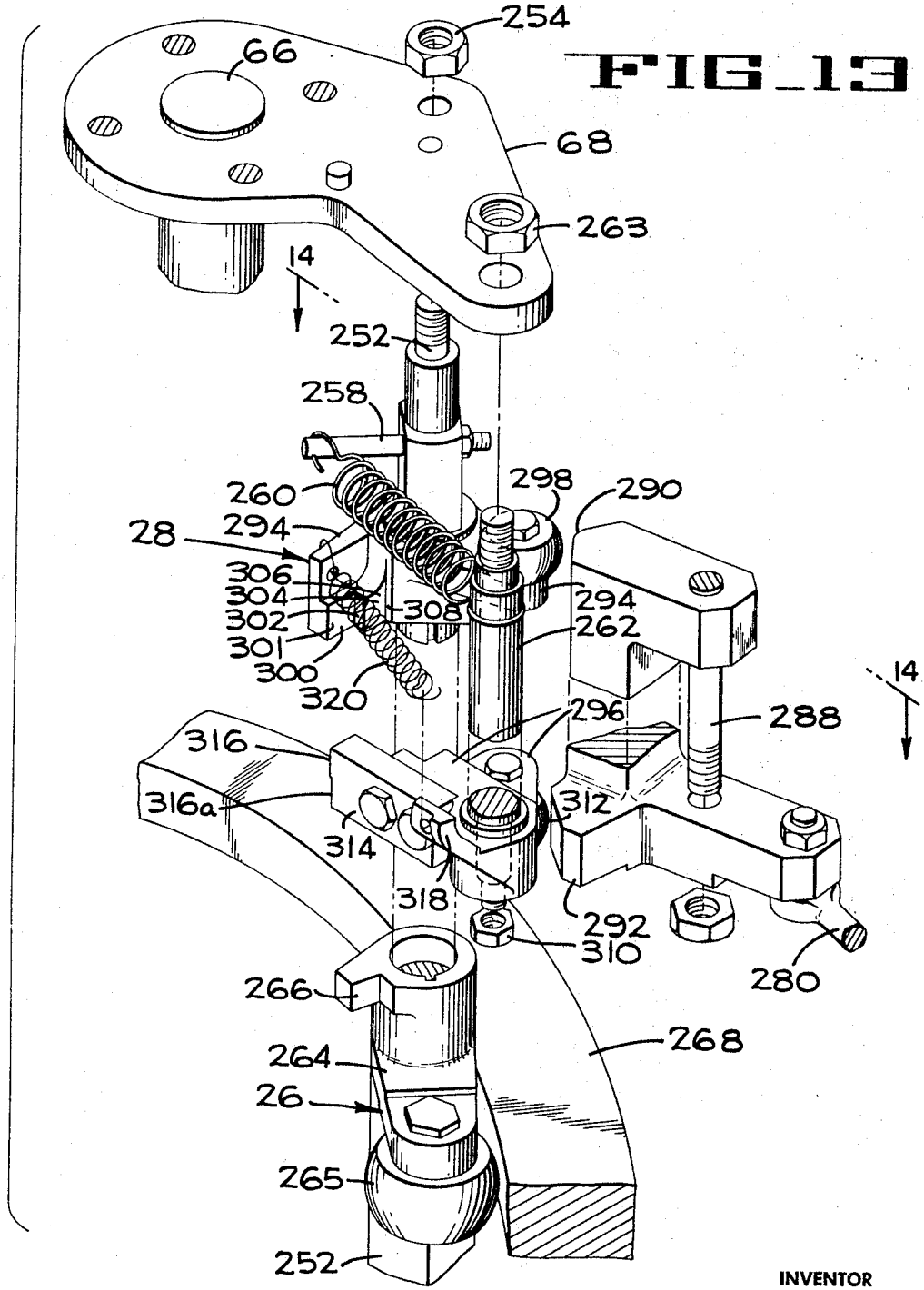

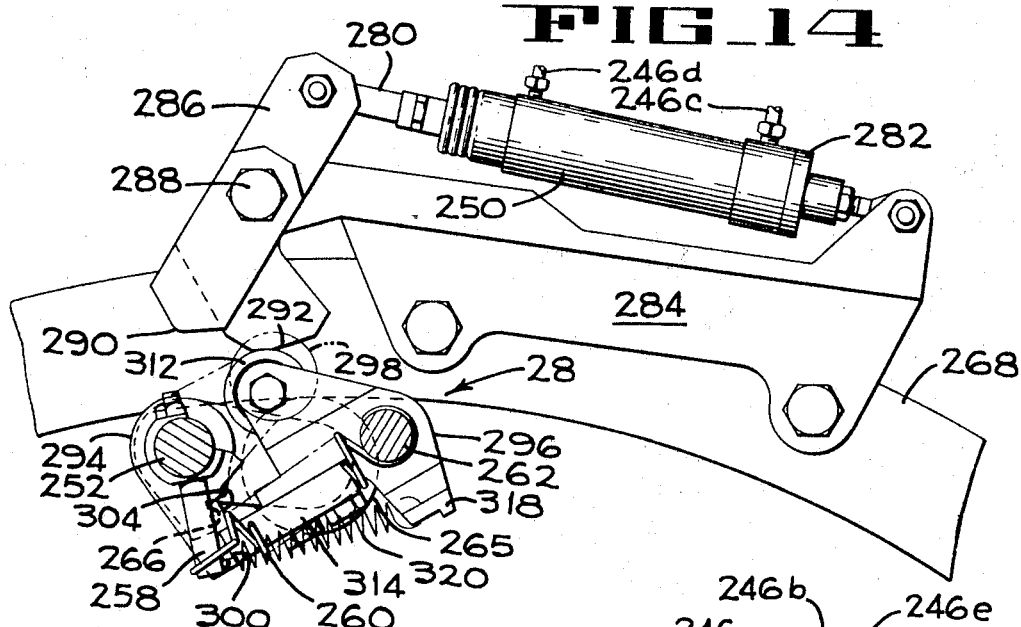
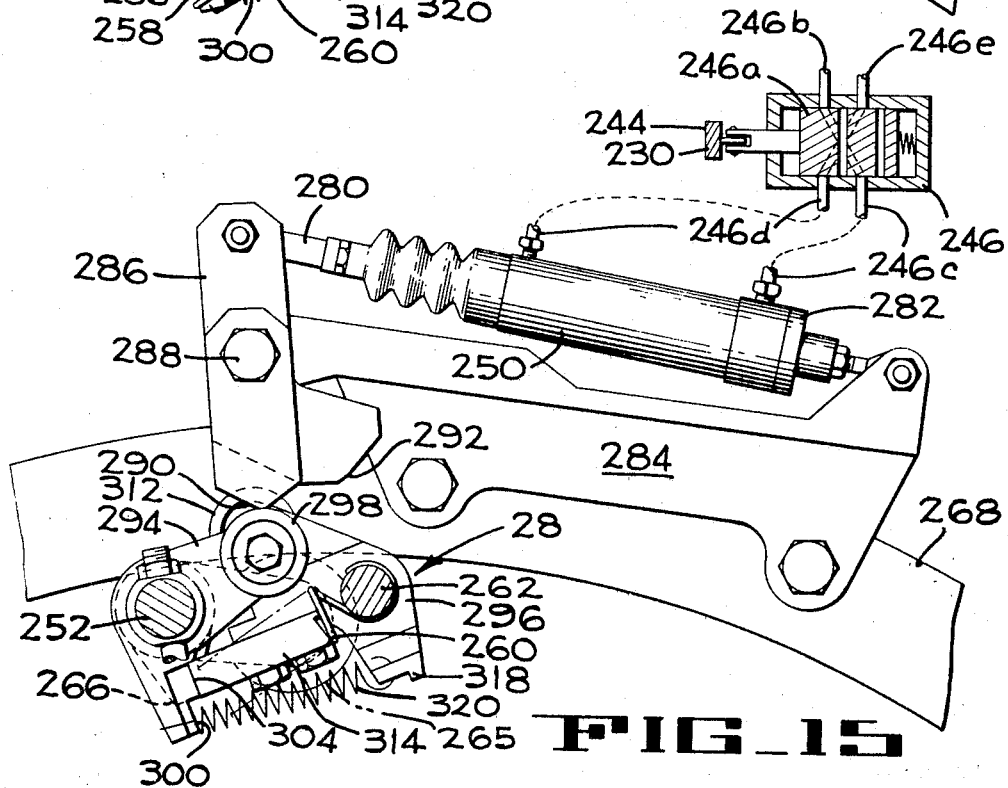

3,442,305
FLUID FLOW CONTROL APPARATUS
Boris Cimlov, San Jose, Calif., assignor to FMC Corporation, San Jose, Calif., a corporation of Delaware
Filed July 8, 1966, Ser. No. 563,736
Int. Cl. B65b 57/02
U.S. Cl. 141—141                                    20 Claims

ABSTRACT OF THE DISCLOSURE

A fluid flow control apparatus for controlling the opening and closing of an inlet valve and a foot valve associated with a vertically movable telescopic variable capacity measuring chamber of a dispenser. The apparatus including a pivotally mounted vertical shaft with vertically elongated cams rigid therewith. The shaft and cams are movable between a first position for simultaneously opening the inlet valve and closing the foot valve while the chamber is increasing in size, and a second position for simultaneously releasing the inlet and foot valve when the chamber is decreasing in size thereby increasing the pressure within the chamber and opening the foot valve to discharge liquid into a container. A no-container no-fill device is contacted by the container carriers to determine the presence or absence of a container therein, and upon detection of the absence of a container locks the vertical shaft in said first position.

---

The present invention pertains to liquid dispensing apparatus and more particularly relates to apparatus for controlling the flow of liquid through a liquid dispensing apparatus.

In assignee's copending application of Robert K. Gellatly, Ser. No. 514,181, filed on Dec. 16, 1965, which issued on Aug. 15, 1967, as Patent No. 3,335,921, a volumetric liquid dispensing apparatus is disclosed which is of generally telescoping construction and utilizes an inlet valve and a foot valve to control the flow of liquid therethrough. When operating the Gellatly dispensing apparatus, the foot valve is held closed and the inlet valve is held open by independent cams when the telescoping parts are being separated so as to draw a predetermined volume of liquid through the inlet valve into a measuring chamber. After the telescoping parts have moved to their fully extended positions so as to confine a predetermined quantity of liquid in the measuring chamber, the inlet valve is cammed closed and the telescoping parts of the dispensing apparatus are foreshortened to reduce the size of the measuring chamber thereby increasing the pressure therein causing the foot valve to open effecting the discharge of a measured quantity of liquid into a carton position therebelow.

When operating the liquid dispensing apparatus at high rates, such as 150 to 200 cartons per minute, it has been determined that it is difficult to reliably time the operation of the inlet valve with the closing of the foot valve when using independent cams for these functions. If the inlet valve is cammed closed while the foot valve is still locked closed and while the inlet valve is moving toward the foot valve, the pressure within the measuring chamber will increase excessively and is apt to damage certain flexible seals in the dispensing apparatus. If the inlet valve is opened during the carton filling stroke of the telescoping dispensing apparatus, some of the liquid which should flow into the carton will flow upwardly past the inlet valve thus improperly filling the carton.

It is, therefore, one object of the present invention to provide apparatus for reliably controlling the flow of fluid through a liquid dispensing apparatus.

Another object is to provide flow control apparatus for synchronizing the actuation of valves in a fluid dispensing apparatus.

Another object is to provide an improved no-carton no-fill device associated width the flow control apparatus.

Another object is to provide a no-carton no-fill device which cooperates with the carton carriers to detect the presence or absence of a carton in each carrier.

Another object is to provide a no-carton no-fill device which is preset by a first carrier which exhibits one characteristic, i.e., either filled or empty, and remains in this position until a carrier having the opposite characteristic moves therepast.

These and other objects and advantages of the present invention will become apparent from the following description and accompanying drawings in which:

FIGURE 1 is a plan of a filling turret incorporating the flow control apparatus of the present invention.

FIGURE 2 is a perspective of the apparatus of FIGURE 1.

FIGURE 3 is a vertical section through the filling turret taken substantially along lines 3—3 of FIGURE 1.

FIGURE 4 is an elevation with parts in central section taken looking substantially along lines 4—4 of FIGURE 1 illustrating a liquid dispensing apparatus with the parts thereof being shown in the positions they assume before the inlet valve is closed.

FIGURE 5 is an enlarged horizontal section taken along the lines 5—5 of FIGURE 3 illustrating the valve actuating mechanism in an inactive carton filling position permitting the foot valve to open and the inlet valve to close.

FIGURE 6 is a horizontal section similar to FIGURE 5 but showing the valve actuating mechanism in an active position positively holding the foot valve closed and the inlet valve open.

FIGURE 7 is an enlarged perspective of one of the carriers with the carrier gate being open.

FIGURE 8 is an elevation of a fragment of one of the carriers taken looking in the direction of lines 8—8 of FIGURE 7.

FIGURE 9 is an elevation of one of the carriers with parts cut away illustrating the carrier gate in full lines, in a closed carton gripping position and in phantom line in an empty carrier position.

FIGURE 10 is an enlarged plan of the carrier engaging portion of a no-carton no-fill device.

FIGURE 11 is an enlarged vertical section taken along lines 11—11 of FIGURE 10 illustrating the actuating pin of a filled carrier in position to engage the no-carton no-fill device.

FIGURE 12 is a horizontal section taken along lines 12—12 of FIGURE 11 illustrating a star wheel braking mechanism for the no-carton no-fill device, said figure being illustrated on the same sheet of drawing containing FIGURE 10.

FIGURE 13 is an enlarged exploded perspective of the no-carton no-fill device locking linkage showing the linkage in combination with a portion of the valve actuating mechanism.

FIGURE 14 is an enlarged horizontal section taken generally along lines 14—14 of FIGURE 13, illustrating the locking linkage being actuated and locked in an inactive position permitting the associated carton to be filled.

FIGURE 15 is a section smiliar to FIGURE 14 but illustrates the locking linkage being actuated into an active position which locks the valve actuating mechanism in an active no-carton position thereby positively holding the associated foot valve closed and the inlet valve open.

The fluid flow control apparatus 20 (FIGS. 1–4) of the present invention is associated with a filling turret 22 having a plurality of dispensing apparatus 23 thereon, which are controlled by a no-carton no-fill device 24. The apparatus 20 also includes a synchronous valve actuating mechanism 26 for each dispensing apparatus 23, and a no-carton no-fill locking linkage 28 for each dispensing apparatus 23. The locking linkage 28 locks the valve actuating mechanism 26 in an inoperative position in response to detection by the no-carton no-fill device 24 of the absence of a carton C from the associated carrier 30 (FIGS. 7 and 10). When locked in the inoperative position the valve actuating mechanism 26 of the associated dispensing apparatus 23 positively holds the inlet valve 32 (FIG. 4) open and a foot valve 34 closed. When a carton is present in the associated valve, the no-carton no-fill device 24 locks the locking linkage 28 in an inoperative position away from the valve actuating mechanism 26 thereby permitting the valve actuating mechanism to operate in its normal manner to fill the carton disposed therebelow.

Since the filling turret 22 and liquid dispensing apparatus 23 is substantially the same as disclosed in the aforementioned Gellatly application, these components will only briefly be described and reference may be had to said application if a more detailed description is desired.

The filling turret 22 (FIGS. 1, 2 and 3) comprises a stationary column 38 having a continuously driven rotary column 40 (FIG. 3) journaled thereon. A tubular turret drive hub 42 having a splash apron 44 bolted thereon, and a conveyor sprocket 46 clamped thereto is mounted for vertical sliding movement on the rotary column 40 so as to accommodate cartons of different heights as fully disclosed in assignee's copending application of Vadas et al., Ser. No. 461,738, which application was filed on June 7, 1965.

A continuously driven endless conveyor 48 having a plurality of evenly spaced carriers 30 mounted thereon is trained around the sprocket 46, around a first idler sprocket 50 (FIG. 1), around a second idler sprocket 52 and around other sprockets (not shown).

The turret 22 includes a lower star wheel bracket 54 which is bolted to the rotary column 40 and is connected to the drive hub 42 by a plurality of drive bolts 56 (only one shown) which bolts are screwed in the hub and are received for vertical sliding motion in collars 58 that are rigid with the star wheel bracket 54.

A liquid supply tank 60 is filled with the liquid to be dispensed and is journaled on the upper end of the stationary column 38. The tank includes a sloping floor having an annular distribution ring 62 near its periphery. The ring is provided with a plurality of ports 64 through which the liquid flows when entering the several dispensing apparatus 23, each of which communicates with one of the ports 64. A plurality of guide rods 66, one for each dispensing apparatus 23, are provided and each rod 66 has its upper end welded to a bracket 68 bolted to the ring 62, and has its lower end received in a pivot block 70 bolted to the lower bracket 54.

As diagrammatically illustrated in FIGURE 3, an upper annular cam 72 and a lower annular cam 74 are supported by the post 38, and are held from rotation relative thereto. A rotatable spider 76 is journaled on the stationary column 38 and includes outwardly projecting legs 78 which receive the guide rods 66 and aid in supporting the same. It is to be understood that a portion of the lower cam 74 is vertically adjustable to handle cartons of different sizes.

Each liquid dispensing apparatus 23 (FIGS. 4, 5 and 6) comprises an inlet tube 80 which is rigidly secured to the tank 60 in communication with an associated one of the ports 64. The lower end of the tube 80 is telescopically received in an inlet housing 82 which has the inlet valve 32 at its lower end. The lower end of the inlet housing 82 telescopically communicates with a measuring housing 84 which includes a filling tube 86 that is inserted into the carton C being filled and when in its lowermost position has its foot valve 34 only slightly above the lower end of the carton. A measuring chamber 87 of variable capacity is defined within the measuring housing 84 between the inlet valve 32 and the foot valve 34 and is arranged to receive a volume of liquid when expanded to its maximum capacity and discharges a predetermined amount of liquid therefrom through the foot valve after being contracted to its minimum capacity position.

The inlet tube 80 is sealed to the upper end of the inlet housing 82 by a flexible resilient sleeve 88 which has one end clamped to the tube 80 and has its other end clamped to the inlet housing. Similarly, the lower end of the inlet housing 82 is sealed to the measuring housing 84 by a flexible sleeve 90 which has one end clamped to the inlet housing 82 and the other end clamped to the measuring housing 84.

In order to selectively open or close the inlet valve 32 (FIGS. 4 to 6), the valve 32 is mounted on the lower end of a vertical rod 92 having centering spiders 94 secured thereto and slidably received in a lower tubular portion of the inlet housing 84 so as to accurately guide the valve 32 during vertical movement. The free end of an actuating lever 96 of a valve actuating mechanism 97 is received in an eye 98 formed on the end of the rod 92. A flexible resilient diaphram 100 is secured in fluid tight relation to a flanged end of the actuating lever 96 by a collar 102 which is fitted over a threaded shank of the lever 96 and is locked in place by the tongue 104 of a yoke 106 and a nut 108. The yoke 106, and accordingly, the actuating lever 96 is pivoted about a bolt 109 which is supported by a bracket 110 (FIG. 4) bolted to the inlet housing 82. The outer periphery 112 of the diaphram 100 is beaded and is secured in fluid tight relationship between a flanged opening 114 of the inlet housing 82 and a flanged annular collar 116 by a clamp ring 118 secured to the mating flanges of the opening end collar. In order to normally hold the inlet valve 32 closed, a spring 120 (FIGS. 3 and 5) is connected between the inlet housing 82 and an extension 122 on the yoke 106. In order to open the inlet valve 32, a cam follower 124 is journaled on an arm 126 extending upwardly from the yoke 106. As will be described in more detail later, the valve actuating mechanism 26 of the present invention is employed to engage the cam follower 124 and open the inlet valve 32 while the turret is moving through a predetermined arcuate range.

The opening and closing of the foot valve 34 is controlled by a mechanism 130 (FIGS. 2 and 4) which is quite similar to the mechanism 97 associated with the inlet valve 32 and accordingly will not be described in detail. It will be noted from FIGURES 2, 5 and 6 that the mechanism 130 lies in a different plane from that of the mechanism 97 and includes a yoke 132 that is pivoted about a pivot bolt 134. The yoke 132 includes an upwardly projecting arm 136 having a cam follower 138 journaled thereon, which cam follower is actuated by the valve actuating mechanism 26 of the present invention to positively close the foot valve 34 while the turret is moving the associated dispensing apparatus 23 through the same arcuate range mentioned above.

In order to vertically reciprocate the inlet housing 82 and measuring housing 84 relative to each other and to the tank 60, a vertically elongated slide block 140 (FIGS. 3 to 6) is slidably received on the shaft 66 and is connected to the inlet housing 82 by bolts 142 and a split block clamp 144. A cam follower 146 is journaled on the sliding block 140 and rides along the upper cam 72 during movement of the valve around the turret 22 thereby vertically reciprocating the inlet housing 82. The measuring housing 84 is connected to an elongated slide block 148 (FIGS. 2, 3 and 4) by bolts 150 and by a split block 152. The slide block 148 is slidably received on the shaft 66 and has a cam follower 154 journaled thereon, which cam follower rides along the lower annular cam 74 as indicated in FIGURE 3. Thus, during rotation of the dispensing apparatus around the axis of the turret 2, the inlet housing 82 and measuring housing 84 are vertically reciprocated in a manner similar to that disclosed in the aforementioned Gellatly application for first drawing liquid into the measuring chamber through the inlet valve 32 when the housings 82 and 84 are moving away from each other, and then closing the inlet valve 32 and forcing a predetermined portion of liquid out of the measuring chamber 87 through the open foot valve 34.

Although the foot valve 34 disclosed herein is an inwardly opening valve, it will be understood that an outwardly opening foot valve such as that disclosed in the Gellatly application will work equally as well with the flow control apparatus 20 of the present invention. The only change necessary for such operation is that the pivot bolt 134 must be placed above the center of the foot valve opening mechanism 130, and the cam follower 138 must be placed below the center of the mechanism 130.

As indicated previously, it is desired that the several dispensing apparatus 23 discharge equal quantities of liquid into each carton. In the event it is determined that one or more of the dispensing apparatus 23 are not discharging the proper amount of liquid during the filling operation, means are provided for independently adjusting the extent of downward movement of each inlet housing to correct this situation. As shown in FIGURES 2 and 3, a stop bolt 156 is associated with each dispensing apparatus 23. Each stop bolt 156 is slidably received in an apertured ear 158 in the associated slide block 140 and has its upper end screwed into the associated leg 78 of the spider 76. The bolt 156 is vertically adjusted and is locked in adjusted position by a nut 160 so as to adjust the particular inlet housing 82 in position to discharge the desired quantity of liquid.

Although the carriers 30 are disclosed in copending applications of Gartin et al. Ser. No. 563,776, which issued on Nov. 14, 1967, as Patent No. 3,352,405, Gartin, Ser. No. 563,860, and Stevenson et al., Ser. No 563,875, which issued on Apr. 16, 1968, as Patent No. 3,378,128, which applications are filed on even date herewith and are assigned to the assignee of the present invention, the carriers 30 will be described herein since they cooperate to control the actuation of the no-carton no-fill device 24.

Each carrier 30 (FIGS. 7 to 9) comprises a body 164 having a pair of pins 166 secured thereto and projecting downwardly therefrom through adjacent links in the chain of the conveyor 48. A rear wall 168 and a side wall 169 are formed integrally with the body 164 and project upwardly therefrom. The free end of the rear wall 168 has an angled abutment block 170 integral therewith, which abutment block cooperates with the walls and with a pivotal gate 172 to square the carton clamped therein.

The gate 172 includes a tongue 174 which is pivoted on a pin 176 journaled in ears 178 and 180 of the body 164 and held in place by a screw 182 (FIG. 8) and keeper 184 that are screwed to the ear 178. The gate 172 includes an arm 186 having an actuating pin 188 projecting laterally outward therefrom and from the side wall 169.

In order to hold the gate 172 selectively into an open position as indicated in FIGURES 7 and 8, a closed carton gripping position as indicated in solid lines in FIGURE 9, or an empty carrier position abutting a sloping surface 189 of the side wall 169 as indicated in phantom lines in FIGURE 9, an overcenter lock mechanism 190 (FIG. 9) is provided. The mechanism 190 comprises a compression spring 192 which is slidably received in a cylindrical bore 194 and is disposed between a screw 196 closing one end of the bore and a plunger 198 slidably received in the other end thereof. The outer end of the plunger abuts a rectangular block 200 which is pivoted on a pin 202 that is secured to the arm 186 at a point eccentric relative to the pivot pin 176. As indicated in FIGURE 9, when the gate 172 is in the empty carton position or carton gripping position, the pin 202 will be below the pivot pin 176 and below the line of force of the spring 192 thus resiliently holding the gate in these positions. When the gate is opened, the pin 202 will be above the pivot pin 176 and above the line of force of the spring 192 thus holding the gate open until closed by some external force.

A feature of the invention is that the gate 172 of each carrier 30 is arranged to hold the gate actuating pin 188 at different elevations depending upon whether a carton is present therein or absent therefrom thereby providing means for operating the no-carton no-fill device 24 (FIGS. 10 to 12). As indicated in FIGURE 11, when a carton is present in a carrier 30 the pin 188 is held at an elevation which will engage one of two diametrically opposite upper fingers 210 of a star wheel 212 when said one upper finger is held adjacent the path of movement of the carriers and will permit the pins 188 of all empty carriers to pass therebelow without contacting said upper finger 210. Engagement of said finger 210 by the pin 188 will cause the star wheel 212 to rotate 90° in a counterclockwise direction as viewed in FIGURE 10.

Similarly, the star wheel 212 includes a pair of opposed lower fingers 214. When one of the lower fingers 214 is disposed adjacent the path of movement of the carriers 30, the pins 188 of all filled carriers will pass thereabove without contacting the same, and the pin of an empty carrier will contact said lower finger 214 and shift the star wheel 90°.

It will be particularly noted that the fingers 210 or 214 of the star wheel 212 will be engaged only by the actuating pins 188 of carriers which exhibit a condition, empty or filled, which is different from that of the proceeding carrier 30. Thus, the first of a series of filled carriers will shift the star wheel 90° and the actuating pins 188 of all following filled carriers will move past the star wheel without contacting the same and accordingly, the star wheel will remain stationary until contacted and rotated 90° by the actuating pin 188 of an empty carrier 30.

The no-carton no-fill device 24 comprises the star wheel 212 having its pairs of upper fingers 210 and lower fingers 214 disposed as indicated in FIGURE 10. The star wheel 212 is keyed and secured by a nut 216 to the upper end of a shouldered shaft 218 (FIG. 11) which is journaled in a skirted housing 220 that is bolted to a cup-shaped housing 222. The housing 222 is rigidly secured to the housing of an idler sprocket 50 which is, in turn, bolted to the frame of the machine.

In order to resiliently control the amount of rotation of the star wheel for each engagement of an actuating pin 188 with a finger 210 or 214, a generally square braking block 224 (FIG. 12) having V-shaped notches 226 in each of its side walls is rigidly secured to the lower end of the shaft 218 by a nut 228 and cooperating key. A generally oval cam 230 is formed on the bottom of the block 224 as indicated in FIGURE 12.

A pair of braking arms 232 and 234 are pivotally mounted by a pin 236 to a yoke 238 which is bolted to the skirted housing 220. A tension spring 240 is connected to the arms 232 and 234 to urge the free ends thereof toward each other, and resiliently maintains cam followers 241 and 242 journaled on the ends of the arms 232 and 234, respectively, into opposed ones of the V-shaped notches 226. Thus, rotation of the star wheel 212 by one of the pins 188 will cause the rollers to move out of one pair of diametrically opposed notches and move them into the next adjacent pair of notches thereby limiting rotation of the star wheel 212 to 90° for each actuation.

As indicated in FIGURES 10 to 12, the star wheel 212 is disposed in position to permit empty carriers 30 to move therepast without being contacted. When in this position, one of two opposed lobes 244 of the oval cam 230 engages and closes a switch or valve 246. When the star wheel is shifted 90° by the actuating pin 188 of a filled carrier, the switch or valve 246 is permitted to open since its actuating element is disposed opposite one of two opposed reduced diameter portions 248 of the oval cam. The switch may be either an electrical or pneumatic switch of any well known design, which switch controls the actuation of a pneumatic power unit 250 (FIGS. 1, 14 and 15) so that the power unit 250 moves the associated locking linkage 28 either into the no-carton no-fill position illustrated in FIGURE 15 when the associated carrier 30 is empty, or into the inactive position of FIGURE 14 when a carton is present in the associated carrier 30.

As diagrammatically illustrated in FIGURE 15, the switch 246 is in the form of a valve having a movable core 246a adapted to be selectively positioned in the illustrated cross-passage position when a carton is not present in the carrier being checked, or a parallel passage position when a carton is in the carrier. As illustrated, high pressure air flows from conduit 246b, through the cross-passage in the core and into the right end of the power unit 250 through conduit 246c. Air is vented from the other end of the power unit through conduit 246d, the cross-passage, and is vented to the atmosphere through conduit 246e. When a filled carrier shifts the cam 230 through a 90° arc, air flows through the parallel passages thus shifting the power unit to the FIGURE 14 position.

As mentioned above, each dispensing apparatus 23 is controlled by an associated one of the valve actuating mechanisms 26 and locking linkages 28. Each locking linkage 28 is, in turn, controlled by the no-carton no-fill device 24 in response to the presence or absence of a carton in the associated carrier 30 in the manner above described.

Each valve actuating mechanism 26 comprises a vertically elongated shaft 252 (FIGS. 3, 5, 6 and 13) which includes portions of square cross section. The upper end of the shaft is pivotally received in the bracket 68 and is held in place by a nut 254. The lower end of the shaft 252 (FIG. 3) is pivotally received in a boss 256 that is bolted to the associated pivot block 70. A spring attachment pin 258 (FIG. 3 and 13) is bolted to the shaft 252 at its upper end, and has one end of a tension spring 260 connected thereto. The other end of the spring 260 is connected to a pivot shaft 262 which has its upper end rigidly connected to the bracket 68 by a nut 263. Thus, the spring 260 tends to pivot the shaft 252 in a counterclockwise direction as viewed in FIGURES 5, 6 and 13.

A valve actuating and locking lever 264 is keyed to the shaft 252 and has a cam follower 265 journaled on the free end thereof. The lever 264 includes a hub having a locking lobe 266 which cooperates with the associated locking linkage in a manner to be described presently.

As indicated in FIGURE 1, a stationary arcuate cam 268 is rigidly secured to utility posts 270 and 272 in position to engage the cam follower 265 of each valve actuating mechanism 26 thereby pivoting the shaft 252 associated with each mechanism in a clockwise direction when the associated dispensing apparatus is moved around the arcuate range of the cam 268.

As best shown in FIGURES 3, 5 and 6, a vertically elongated angle cam bar 276 is bolted to the shaft 252 and is positioned to engage the cam follower 124 and positively open the inlet valve 32 (FIG. 4) when the cam follower 265 is moving around the arcuate cam 268 as indicated in FIGURE 6. It will be understood that the angle cam bar 276 is vertically elongated and is of sufficient length to maintain contact with the cam follower 124 while the inlet housing 82 is reciprocated vertically.

A vertically elongated lower cam bar 278 is positioned to engage the cam follower 138 and positively hold the foot valve 34 closed when the inlet valve is held open as indicated in FIGURE 6. The cam bar 278, like the angle cam bar 276, is sufficiently long to maintain contact with the cam follower 138 to permit vertical reciprocation of the measuring housing 84 through its entire stroke when the valve actuating mechanism 26 is held in its active, no-fill position indicated in FIGURE 6.

When the cam follower 265 of the valve actuating mechanism 26 moves out of contact with the arcuate cam 268 and is pivoted outwardly by the spring 260 (FIG. 13) into the unoccupied arcuate area between the ends of the arcuate cam 268, the cam bars 276 and 278 are spaced from the cam follower 124 and 138, respectively, as indicated in FIGURE 5, and thus the valve actuating mechanism 26 is inoperative at this time. While passing through this unoccupied area, the inlet housing 82 and measuring housing 84 are moved toward each other thereby reducing the size of the measuring chamber 87 and increasing the pressure within the chamber. The increase of the pressure within the measuring chamber 87 opens the foot valve 34 and aids the spring 120 by exerting a closing force against the inlet valve 32 to forcibly close the valve 32 thereby causing a measured volume of liquid to flow into the particular carton C that is clamped in the associated carrier thereby filling the carton.

When a carton is present in the carrier 30 as above described, the no-carton no-fill device 24 will cause the piston rod 280 of the pneumatic power unit 250 to assume the retracted position shown in FIGURE 14 thereby holding the locking linkage 28 in an inactive position. In the event a carton is not present in one of the carriers 30, the no-carton no-fill device 24 senses such condition and causes the power unit 250 to move its piston rod 280 to the extended no-carton position illustrated in FIGURE 15. When in this position, the locking linkage 28 engages the locking lobe 266 (FIG. 13) and locks the valve actuating mechanism 26 in the active foot valve closing position illustrated in FIGURE 6.

The locking linkage 28 (FIGS. 4 and 13–15) is actuated into its two positions by the pneumatic power unit 250 which unit includes a cylinder 282 pivotally connected to a bracket 284 that is bolted to the arcuate cam 268. The piston rod 280 of the power unit 250 is pivotally connected to a lever 286 that is pivoted to the bracket 284 about a bolt 288. The lever 286 includes an upper camming surface 290 and a lower camming surface 292.

The locking linkage 28 comprises an upper bell crank 294 which is pivoted on the elongated shaft 252 and abuts the upper surface of the locking lever 264, and a lower bell crank 296 pivoted on the shaft 262. The upper bell crank 294 has a cam follower 298 journaled on one end and has a latching notch 300 formed on its other end defined by abutment surfaces 301 and 302 (FIG. 13). A no-carton notch 304 defined by surfaces 306 and 308 is disposed radially inwardly of the notch 300 relative to the axis of the shaft 252. The cam follower 298 is arranged to engage the upper camming surface 290 when positioned as illustrated in FIGURE 15 but clears the camming surface when positioned as illustrated in FIGURE 14.

The lower bell crank 296 is held on the shaft 262 by a nut 310 (FIG. 13) and has a cam follower 312 journaled on the end of one of its legs. A latching bar 314 is bolted to the other leg of the bell crank 296 and has an end surface 316 (FIG. 13) relieved at 316a, which is adapted to be selectively positioned in either the latching notch 300 or the no-carton notch 304. When in the no-carton notch 304, the relieved lower portion 316a of the end surface 316 is positioned in the notch defined by the locking lobe 266 of the locking lever 264, as indicated in FIGURE 15. A spring connecting arm 318 is integral with an projects upwardly from the lower bell crank 296. One end of a tension spring 320 is connected to arm 318 while its other end is connected to the upper bell crank 294 adjacent the latching notch 300. Thus, the spring 320 urges both cam followers 298 and 312 radially outward of the turret at all times.

When the power unit 250 moves and thereafter holds the lever 286 in the inactive position illustrated in FIGURE 14, the locking linkage 28 is shifted to its inactive position with its latching bar 314 received in the latching notch 300, and accordingly is held out of the path of pivotal movement of the locking lobe 266 of the valve actuating mechanism 26. Thus, when the cam follower 265 of the actuating mechanism 26 moves out of contact with the arcuate cam 268, the spring 260 will pivot the actuating mechanism 26 to the inactive or filling position illustrated in FIGURE 5 thereby permitting the associated dispensing apparatus 23 to discharge a predetermined quantity of liquid into the carton carried by the associated carrier 30.

The power unit 250 will hold the lever 286, and will actuate each following locking linkage 28, in the FIGURE 14 position until an empty carrier shifts the star wheel 212 (FIG. 10) of the no-carton no-fill device 24 through an arcuate range of 90° thereby activating the power unit 250 causing the lever 286 to shift to the position illustrated in FIGURE 15. The cam follower 298 then engages the cam 290 causing the free end 316 of the latching bar 314 to move into the no-carton notch 304 under the influence of the spring 320. At this time, it will be noted that the lower stepped portion 316a (FIG. 13) of the locking lever 264 moves into registration with the locking lobe 266 thereby preventing pivotal movement of the shaft 252 of the valve actuating mechanism 26. Thus, the mechanism 26 is locked in the position illustrated in FIGURE 6 wherein the foot valve 34 (FIG. 4) is locked closed and the inlet valve 32 is locked open thereby preventing discharge of liquid from the associated dispensing apparatus 23. The illustrated locking linkage 28 remains in this active no-carton position and all following linkages 28 are set in this position until such time as the no-carton no-fill device 24 detects a filled carrier and activates the power unit 250 causing the lever 286 to return to the FIGURE 14 position.

Although the operation of the fluid flow control apparatus 20 of the present invention has been covered during the description of the several components of the apparatus, a brief résumé of the operation will follow and will be described as though only one dispensing apparatus 23 and associated parts are mounted on the turret.

Liquid, such as milk, is directed into the supply tank 60 (FIG. 3), and the filling turret 22 is continuously rotated. As the turret 22 moves the dispensing apparatus 23 into the arcuate range of control of the arcuate cam 268, the cam follower 265 engages the cam 268 and pivots the valve actuating mechanism 26 into the position illustrated in FIGURE 6 thereby holding the foot valve 34 (FIG. 4) closed and the inlet valve 32 open. Liquid, then flows from the tank 60 to completely fill the measuring chamber 87 defined by the inlet housing 82 and measuring housing 84. While moving around the cam 268, the annular cams 72 and 74 (FIG. 3) will cause the inlet housing 82 and measuring housing 84 to expand thereby drawing a predetermined quantity of liquid into the measuring chamber 87. At this time the filling tube 86 is moved downwardly into the associated carton near the lower end thereof.

If a carton is present in the associated carrier 30, and the gate actuating pin 188 (FIG. 10) shifts the star wheel 212 through 90° when an upper finger 210 is disposed adjacent the path of movement of the pin 188, or if one of the lower fingers 214 is disposed adjacent the path of movement of the carrier and the actuating pin 188 of the carrier moves freely therepast, the power unit 250 (FIG. 14) will respectively move into or maintain the cam lever 286 in the filling position illustrated in FIGURE 14. When in this position, the latching bar 314 of the locking linkage 28 (FIG. 14) is disposed in the notch 300 permitting the spring 260 to shift a valve actuating mechanism 26 to the FIGURE 5 position when the cam follower 265 moves out of engagement with the arcuate cam 268. When in this position, the spring 120 will hold the inlet valve 32 (FIG. 4) closed, and the foot valve 34 will remain closed until the inlet housing 82 and measuring housing 84 are cammed toward each other by the annular cams 72 (FIG. 3) and 74. Such camming action increases the pressure within the measuring chamber 87 thereby opening the foot valve 34 and causes an initial slow discharge of fluid into the carton in a preliminary fill operation to enter the carton to a level slightly above the foot valve 34, and thereafter more rapidly continues the filling operation until such time as the carton is filled with said predetermined quantity of liquid. The filling operation is described in more detail in the aforementioned copending Gellatly application, and reference may be had to this application if a more detailed description of the filling operation is desired.

If a carton is not present in a carrier 30, the gate actuating pin 188 (FIGS. 10 and 11) will be disposed in its lowermost position and will either pass below an upper finger 210 of the star wheel 212 of the no-carton no-fill device 24, or will contact a lower finger 214 of the star wheel and shift the star wheel 90° thereby causing power unit 250 to assume the FIGURE 15 position. When in this position, the latching bar 314 of the locking linkage 28 will engage both the no-carton notch 304 and the notch defined by the locking lobe 266 of the valve actuating mechanism 26. Thus, after the cam follower 265 moves out of engagement with the arcuate cam 268, the valve actuating mechanism 26 is locked from pivotal movement in the position illustrated in FIGURE 6. Accordingly, the foot valve 34 will at this time be locked closed and the inlet valve will be locked open. At this time vertical reciprocation of the inlet housing 82 and measuring housing 84 toward each other will cause the liquid to flow upwardly through the inlet valve and return to the tank rather than out of the chamber through the foot valve 34.

From the foregoing description it will be apparent that the fluid flow control apparatus of the present invention includes a valve actuating mechanism arranged to simultaneously lock an inlet valve open and a foot valve closed, or to simultaneously release both valves for independent operation in response to a buildup of pressure in a measuring chamber. Also, the control apparatus includes a no-carton no-fill device which is actuated only by carton carriers which exhibit a characteristic, empty or filled, which is different from the immediately preceding carrier, and which controls the locking linkage to either lock the associated valve actuating mechanism in an inoperative position or in a position permitting the pressure within the measuring chamber to open the foot valve.

While one embodiment of the present invention has been shown and described, it will be understood that various changes and modifications may be made without departing from the spirit of the invention or the scope of the appended claims.

Having thus described the invention and the manner in which the same is to be used, what is claimed as new and desired to be protected by Letters Patent is:

1. A fluid flow control apparatus comprising dispensing apparatus defining a variable capacity measuring chamber, means defining an inlet valve in said dispensing apparatus for controlling the flow of liquid into said chamber, means defining an outlet valve for controlling the flow of liquid out of said chamber, means for alternately increasing the size of said chamber for accepting a quantity of liquid therein and for decreasing the size of said chamber to discharge a predetermined quantity of liquid therefrom, means for normally closing said inlet valve, pressure responsive means for opening said outlet valve, carrier means for supporting a container in position to receive liquid flowing through said outlet valve, and valve actuating means including a vertically elongated shaft mounted for pivotal movement about a vertical axis, and cam means rigidly secured to and movable with said shaft between a first position for simultaneously opening the inlet valve and closing the outlet valve while said chamber is increasing in size and a second position for simultaneously releasing said inlet and outlet valves when said chamber is decreasing in size thereby increasing the pressure within said chamber effecting the opening of the outlet valve and the discharge of a predetermined quantity of liquid into the container.

2. A fluid flow control apparatus comprising dispensing apparatus defining a variable capacity measuring chamber; means defining an inlet valve in said dispensing apparatus for controlling the flow of liquid into said chamber; means defining an outlet valve for controlling the flow of liquid out of said chamber; means for alternately increasing the size of said chamber for accepting a quantity of liquid therein and for decreasing the size of said chamber to discharge a predetermined quantity of liquid therefrom; means for normally closing said inlet valve; pressure responsive means for opening said outlet valve; carrier means for supporting a container in position to receive liquid flowing through said outlet valve; valve actuating means movable between a first position for simultaneously opening the inlet valve and closing the outlet valve while said chamber is increasing in size and a second position for simultaneously releasing said inlet and outlet valves when said chamber is decreasing in size thereby increasing the pressure within said chamber effecting the opening of the outlet valve and the discharge of a predetermined quantity of liquid into the container; and a no-container no-fill means provided to detect the absence or presence of a container in the carrier means and operative upon detection of the absence of a container from said carrier means to positively hold said valve actuating means in said first position when said chambed is decreasing in size to prevent discharge of liquid past the outlet valve; said carrier means including a pivotal gate selectively movable between an open position, an empty carrier position and a filled carrier position; resilient means for holding said gate in said selected positions; and abutment means rigid with said gate for actuating said no-container no-fill means.

3. An apparatus according to claim 2 wherein said abutment means is disposed at a first elevation when said gate is in the filled carrier position and a second elevation when said gate is in an empty carrier position, said no-container no-fill means including a star wheel, means for moving said carrier means past said star wheel along a predetermined path, a pair of opposed upper fingers on said star wheel disposed at one of said elevations, a pair of opposed lower fingers on said star wheel disposed at said other elevation, said star wheel being positioned so that one of said fingers is disposed in an actuating station adjacent said path of movement of said carrier means, said abutment means being adapted to move freely past said finger at said actuating station when not at the same elevation as one finger and adapted to engage and shift the star wheel through a predetermined arcuate range when said one finger is at the same elevation, and means for limiting the movement of said star wheel to said predetermined arcuate range.

4. A fluid flow control apparatus comprising liquid supply means, an inlet housing communicating with said liquid supply means and having an inlet valve on one end, a measuring housing sealed to and telescopically received by said inlet housing and having a foot valve on one end, said inlet housing and measuring housing defining a measuring chamber between said valves, means for normally closing said inlet valve, means responsive to an increase of pressure within said measuring chamber for opening said foot valve, valve actuating means including a vertically elongated shaft mounted for pivotal movement about a vertical axis, cam means rigidly secured to and movable with said shaft between a first position for simultaneously opening the inlet valve and closing the foot valve and a second position simultaneously releasing said inlet valve and said foot valve, carrier means for supporting a container in position to receive liquid from said measuring chamber, and means for moving said inlet housing and said measuring housing away from each other to enlarge said measuring chamber and accept a predetermined quantity of liquid therein when said vertical shaft is in said first position and for moving the inlet housing and measuring housing toward each other to increase the pressure within said measuring chamber thereby opening said foot valve and discharging a predetermined quantity of liquid through said foot valve into the container when said vertical shaft is in said second position.

5. A fluid flow control apparatus comprising liquid supply means; an inlet housing communicating with said liquid supply means and having an inlet valve on one end; a measuring housing sealed to and telescopically received by said inlet housing and having a foot valve on one end; said inlet housing and measuring housing defining a measuring chamber between said valves; means for normally closing said inlet valve; means responsive to an increase of pressure within said measuring chamber for opening said foot valve; valve actuating means movable between a first position for simultaneously opening the inlet valve and closing the foot valve and a second position simultaneously releasing said inlet valve and said foot valve; carrier means for supporting a container in position to receive liquid from said measuring chamber; means for moving said inlet housing and said measuring housing away from each other to enlarge said measuring chamber and accept a predetermined quantity of liquid therein when said valve actuating means is in said first position and for moving the inlet housing and measuring housing toward each other to increase the pressure within said measuring chamber thereby opening said foot valve and discharging a predetermined quantity of liquid through said foot valve into the container when said valve actuating means is in said second position; a no-container no-fill means provided for detecting the absence or presence of a container in the carrier means and operative upon detection of the absence of a container from said carrier means to positively hold said valve actuating means in said first position during movement of said inlet housing and said measuring housing toward each other to prevent discharge of liquid past said foot valve; said carrier means including a pivotal gate selectively movable between an open position, an empty carrier position, and a filled carrier position; resilient means for holding said gate in said selected position; and abutment means rigid with said gate for actuating said no-container no-fill means.

6. An apparatus according to claim 5 wherein said abutment means is disposed at a first elevation when said gate is in the filled carrier position and a second elevation when said gate is in an empty carrier position, said no-container no-fill means including a star wheel, means for moving said carrier means past said star wheel along a predetermined path, a pair of opposed upper fingers on said star wheel disposed at one of said elevations, a pair of opposed lower fingers on said star wheel disposed at said other elevation, said star wheel being positioned so that one of said fingers is disposed in an actuating station adjacent said path of movement of said carrier means, said abutment means being adapted to move freely past said finger at said actuating station when not at the same elevation as said one finger and adapted to engage and shift said star wheel through a predetermined arcuate range when said one finger is at the same elevation, and means for limiting the movement of said star wheel to said predetermined arcuate range.

7. An apparatus according to claim 4 wherein said means for normally closing said inlet valve includes a first yoke pivotally mounted on said inlet housing, and a first cam follower on said yoke; wherein said means for opening said foot valve includes a second yoke pivotally mounted on said measuring housing, a second cam follower on said second yoke; and wherein said cam means includes a first elongated cam bar secured to said shaft adjacent said first cam follower, and a second elongated cam bar secured to said shaft adjacent said second cam follower, said first and second cam bars being of sufficient length to maintain engagement with said first and second cam followers when said valve actuating means is in said first position and while said cam followers are moving the entire length of their measuring chamber enlarging stroke.

8. An apparatus according to claim 7 and additionally including resilient means urging said shaft into said second position, a third cam follower connected to said shaft, and cam means engageable with said third cam follower for moving said shaft into said second position while said inlet housing and measuring housing are moving toward each other.

9. A fluid flow control apparatus comprising a continuously driven turret, liquid supply means, an inlet housing on said turret communicating with said liquid supply means and having an inlet valve on one end, a measuring housing on said turret sealed to and telescopically received by said inlet housing and having a foot valve on one end, said inlet housing and measuring housing defining a measuring chamber between said valves, means carried by said inlet housing for normally closing said inlet valve, means carried by said measuring housing responsive to an increase of pressure within said measuring chamber for opening said foot valve, valve actuating means partially carried by said turret and including a vertically elongated shaft mounted for pivotal movement about a vertical axis, cam means rigidly secured to and movable with said shaft between a first position for simultaneously opening the inlet valve and closing the foot valve and a second position for simultaneously releasing said inlet valve and said foot valve, carrier means movable along a predetermined path including an arcuate portion concentric with said turret for supporting a container in position to receive liquid from said measuring chamber while moving along said arcuate portion of said path, and means for moving said inlet housing and measuring housing away from each other to enlarge said measuring chamber and accept a quantity of liquid therein when said valve actuating means is in first position and for moving the inlet housing and measuring housing toward each other to increase the pressure within said measuring chamber thereby opening said foot valve and discharging a predetermined quantity of liquid through said foot valve into the container when said valve actuating means is in said second position.

10. A fluid flow control apparatus comprising a continuously driven turret; liquid supply means; and inlet housing on said turret communicating with said liquid supply means and having an inlet valve on one end; a measuring housing on said turret sealed to and telescopically received by said inlet housing and having a foot valve on one end; said inlet housing and measuring housing defining a measuring chamber between said valves; means carried by said inlet housing for normally closing said inlet valve; means carried by said measuring housing responsive to an increase of pressure within said measuring chamber for opening said foot valve; valve actuating means partially carried by said turret and movable between a first position for simultaneously opening the inlet valve and closing the foot valve and a second position for simultaneously releasing said inlet valve and said foot valve; carrier means movable along a predetermined path including an arcuate portion concentric with said turret for supporting a container in position to receive liquid from said measuring chamber while moving along said arcuate portion of said path; means for moving said inlet housing and measuring housing away from each other to enlarge said measuring chamber and accept a quantity of liquid therein when said valve actuating means is in said first position and for moving the inlet housing and measuring housing toward each other to increase the pressure within said measuring chamber thereby opening said foot valve and discharging a predetermined quantity of liquid through said foot valve into the container when said valve actuating means is in said second position; a no-container no-fill means provided for detecting the absence or presence of a container in the carrier means and operative upon detection of the absence of a container from said carrier means to positively hold said valve actuating means in said first position during movement of said inlet housing and said measuring housing toward each other to prevent discharge of liquid past said foot valve; said carrier means including a pivotal gate selectively movable between an open position, an empty carrier position, and a filled carrier position; resilient means for holding said gate in the selected ones of said positions; and abutment means rigid with said gate for actuating said no-container no-fill means.

11. An apparatus according to claim 10 wherein said abutment means is disposed at a first elevation when said gate is in the filled carrier position and a second elevation when said gate is in an empty carrier position, said no-container no-fill means including a star wheel, means for moving said carrier means past said star wheel along a predetermined path, a pair of opposed upper fingers on said star wheel disposed at one of said elevations, and a pair of opposed lower fingers on said start wheel disposed at said other elevation, said star wheel being positioned so that one of said fingers is disposed in an actuating station adjacent said path of movement of said carrier means, said abutment means being adapted to move freely past said finger at said actuating station when not at the same elevation as said one finger and adapted to engage and shift said star wheel through a predetermined arcuate range when said one finger is at the same elevation, and means for limiting the movement of said star wheel to said predetermined arcuate range.

12. An apparatus according to claim 9 wherein said means for normally closing said inlet valve includes a first yoke pivotally mounted on said inlet housing, and a first cam follower journaled on said yoke; wherein said means for opening said foot valve includes a second yoke pivotally mounting on said measuring housing, and a second cam follower journaled on said second yoke; and wherein said cam means includes a first elongated cam bar secured to said shaft adjacent said first cam follower, and a second elongated cam bar secured to said shaft adjacent said second cam follower, said first and second cam bars being of sufficient length to maintain engagement with said first and second cam followers when said valve actuating means is in said first position throughout the entire measuring chamber enlargement stroke.

13. An apparatus according to claim 12 and additionally including resilient means urging said shaft into said second position, a lever secured to said shaft, a third cam follower on said lever, and a stationary arcuate cam concentric with said turret and disposed in position to engage said cam to pivot and thereafter hold said shaft in said first position when said inlet housing and measuring housing are moving away from each other, said shaft being resiliently urged into said second position when said third cam follower moves out of engagement with said second arcuate cam.

14. An apparatus according to claim 13 and additionally comprising a lobe on said lever, locking means carried by said turret and selectively movable between a locked position in engagement with said lobe preventing said shaft from moving into said second position after said third cam follower moves out of engagement with said arcuate cam, and an inactive position disposed away from said lobe, and a no-container no-fill means for sensing the presence or absence of a container in said carrier means, said no-container no-fill means causing movement of said locking means behind said lobe in response to detection of any empty carrier and causing movement of the locking means into said inactive position in response to the detection of a container in the carrier means.

15. A fluid flow control apparatus comprising a continuously driven turret; liquid supply means; an inlet housing on said turret communicating with said liquid supply means and having an inlet valve on one end; a measuring housing on said turret sealed to and telescopically received by said inlet housing and having a foot valve on one end; said inlet housing and measuring housing defining a measuring chamber between said valves; means carried by said inlet housing for normally closing said inlet valve; means carried by said measuring housing responsive to an increase of pressure within said measuring chamber for opening said foot valve; valve actuating means partially carried by said turret and movable between a first position for simultaneously opening the inlet valve and closing the foot valve and a second position for simultaneously releasing said inlet valve and said foot valve; carrier means movable along a predetermined path including an arcuate portion concentric with said turret for supporting a container in position to receive liquid from said measuring chamber while moving along said arcuate portion of said path; means for moving said inlet housing and measuring housing away from each other to enlarge said measuring chamber and accept a quantity of liquid therein when said valve actuating means is in said first position and for moving the inlet housing and the measuring housing toward each other to increase the pressure within said measuring chamber thereby opening said foot valve and discharging a predetermined quantity of liquid through said foot valve into the container when said valve actuating means is in said second position; said means for normally closing said inlet valve including a first yoke pivotally mounted on said inlet housing, and a first cam follower journaled on said yoke; said means for opening said foot valve including a second yoke pivotally mounted on said measuring housing, and a second cam follower journaled on said second yoke; and said valve actuating means including an elongated shaft mounted adjacent both cam followers, a first elongated cam bar secured to said shaft adjacent said first cam follower, and a second elongated cam bar secured to said shaft adjacent said second cam follower, said first and second cam bars being of sufficient length to maintain engagement with said first and second cam followers when said valve actuating means is in said first position throughout the entire measuring chamber enlargement stroke; said elongated shaft being pivotally mounted on said turret for movement between said first and second positions; resilient means urging said shaft into said second position; a lever secured to said shaft; a third cam follower on said lever; and a stationary arcuate cam concentric with said turret and disposed in position to engage said cam to pivot and thereafter hold said shaft in said first position when said inlet housing and said measuring housing are moving away from each other; said shaft being resiliently urged into said second position when said third cam follower moves out of engagement with said second arcuate cam; a lobe on said lever; locking means carried by said turret and selectively movable between a locking position in engagement with said lobe preventing said shaft from moving into said second position after said third cam follower moves out of engagement with said arcuate cam; an an inactive position disposed away from said lobe; and a no-container no-fill means for sensing the presence or absence of a container in said carrier means, said no-container no-fill means causing movement of said locking means behind said lobe in response to detection of any empty carrier and causing movement of the locking means into said inactive position in response to the detection of a container in the carrier means; said carrier means including a pivotal gate selectively movable between an opened position, an empty carrier position, and a filled position; resilient means for selectively holding said gate in said selected positions; and abutment means rigid with said gate for actuating said no-container no-fill means.

16. An apparatus according to claim 15 wherein said abutment means is disposed at a first elevation when said gate is in the filled carrier position and a second elevation when said gate is in an empty carrier position, said no-container no-fill means including a star wheel, means for moving said carrier means past said star wheel along said arcuate portion of said path, a pair of upper fingers on said star wheel disposed at one of said elevations, and a pair of opposed lower fingers on said star wheel disposed at said other elevations, said star wheel being posposed so that one of said fingers is disposed in an actuating station adjacent said path of movement of said carrier means, said abutment means being adapted to move freely past said finger at said actuating station when not at the same elevation as said one finger and adapted to engage and shift said star wheel through a predetermined arcuate range when said one finger is at the same elevation, and means for limiting the movement of said star wheel to said predetermined arcuate range.

17. An apparatus according to claim 15 wherein said locking means includes a first bell crank pivoted on said shaft adjacent said lever and having two legs, said first bell crank having means defining a latching notch and a no-container notch on one of said legs and a first cam engaging means on said other leg, a second bell crank pivotally mounted on said turret adjacent said first bell crank and having two legs, second cam engaging means on one leg of said second bell crank and a latching bar rigid with the other leg of said second bell crank and having a free end adapted to be selectively positioned either in said inactive position in engagement with said latching notch and spaced from said locking lobe, or in said no-container position in engagement with said no-container notch and said locking lobe, resilient means connected to said first and second bell cranks for holding said latching bar in selected position, said no-container no-fill means including a cam lever having first and second camming surfaces, and power means connected to said cam lever for moving said first camming surface into engagement with said first cam engaging means and said second camming surface away from said second cam engaging means in response to detection of the absence of a carton in said carrier means thereby causing said free end of said latching bar to engage said no-carton notch and said locking lobe, said power means moving said second camming surface into engagement with said second cam engaging means and said first camming surface away from said first cam engaging means in response to detection of the presence of a carton in said carrier means thereby causing said free end of said latching bar to engage said latching notch.

18. An apparatus according to claim 11 wherein a plurality of inlet housings, measuring housings, and valve actuating means are carried by and are evenly spaced around said turret; and wherein a plurality of carrier means are provided with a separate one of said carrier means being associated with each of said measuring housings; and wherein the gates of all carrier means having their gate abutment means positioned at the same elevation as the gate abutment means of a preceding gate will move freely past said no-container no-fill means without actuating the same.

19. An apparatus according to claim 17 wherein a plurality of inlet housings, measuring housings, valve actuating means, and locking means are carried by and are evenly spaced around said turret; and wherein a plurality of carrier means are provided with a separate one of said carrier means being associated with associated said measuring housings; wherein the gates of all carrier means having their gate abutment means positioned at the same elevation as the gate abutment means of a preceding gate will move freely past said no-container no-fill means without actuating the same; and wherein said power means holds said cam lever is preselected position until reactivated by said no-container no-fill means in response to detection of a carrier gate abutment means being at a different elevation from that of the preceding carrier means.

20. A fluid flow control apparatus comprising means defining a liquid measuring chamber; means for directing a liquid into said chamber to fill the same; means defining an outlet valve for controlling the flow of liquid out of said chamber; carrier means for supporting a container in position to receive liquid flowing through said outlet valve; valve actuating means movable between a first position for closing said outlet valve, and a second position for opening said outlet valve; no-container no-fill means for detecting the absence or presence of a container in said carrier means and operative upon detection of the absence of a container from said carrier means to positively hold said valve actuating means in said first position to prevent discharge of liquid past the outlet valve; said carrier means including a pivotal gate selectively movable between an open position, an empty carrier position and a filled carrier position; resilient means for holding said gate in said selected position; and abutment means carried by said gate for actuating said no-container no-fill means.

References Cited

UNITED STATES PATENTS

| | | | |
|---|---|---|---|
| 2,362,793 | 11/1944 | Ayars | 141—143 X |
| 3,010,618 | 11/1961 | Matejek | 141—141 X |
| 3,335,921 | 8/1967 | Gellatly | 222—448 |

HOUSTON S. BELL, JR., *Primary Examiner.*

U.S. Cl. X.R.

222—448